United States Patent
Nakagawa

[11] Patent Number: 6,154,330
[45] Date of Patent: Nov. 28, 2000

[54] DISK PROVIDED WITH SERVO PATTERNS AND METHOD OF RECORDING SERVO PATTERNS

[75] Inventor: Masayoshi Nakagawa, Fukushima-ken, Japan

[73] Assignee: ALPS Electric Co., Ltd., Japan

[21] Appl. No.: 09/153,138

[22] Filed: Sep. 15, 1998

[30] Foreign Application Priority Data

Sep. 17, 1997 [JP] Japan .................................. 9-251871

[51] Int. Cl.[7] ...................................................... G11B 5/09
[52] U.S. Cl. ............................ 360/48; 360/77.08; 360/75
[58] Field of Search ................... 360/48, 77.08, 360/78.14, 75

[56] References Cited

U.S. PATENT DOCUMENTS 5,801,897  9/1998  Kanda et al. ..................... 360/78.14 X
5,867,337  2/1999  Shimomura ....................... 360/77.08 X

FOREIGN PATENT DOCUMENTS 692 09 532
T2          9/1996   Germany .
9-63217     3/1997   Japan .
9063217A    3/1997   Japan .

OTHER PUBLICATIONS

IBM Technical Disclosure Bulletin, vol. 31, No. 3, dated Aug. 1988, pp. 265–266.

*Primary Examiner*—Andrew L. Sniezek
*Attorney, Agent, or Firm*—Brinks Hofer Gilson & Lione

[57] ABSTRACT

Each of servo patterns comprises servo information, an A burst signal and a B burst signal. The servo patterns are recorded at a smaller track pitch Tp in a data zone of a disk, and are recorded in a first nondata zone at a greater track pitch Tp1 greater than the smaller track pitch Tp. Therefore a tracking servo control operation is effective even if the magnetic head of a disk drive moves into the nondata zone. Since the servo patterns are recorded in the nondata zone at the greater pitch Tp1, the time necessary for recording the servo patterns can be reduced.

5 Claims, 5 Drawing Sheets

DISK PROVIDED WITH SERVO PATTERNS AND METHOD OF RECORDING SERVO PATTERNS

BACKGROUND OF THE INVENTION

1. Field of the Invention

The present invention relates to a magnetic recording medium, such as a floppy disk, and, more specifically, to a disk provided with servo patterns for high-density recording and a method of recording such servo patterns.

2. Description of the Related Art

A floppy disk provided with servo patterns previously recorded on narrow tracks is used as a recording medium for the high-density recording of signals. FIG. 5A is a typical plan view of servo patterns recorded on such a disk, FIG. 5B is an enlarged plan view of portion Zz in FIG. 5A, and FIG. 3 is a plan view of a section of a floppy disk D. The both sides of the disk D shown in FIG. 3 serve as recording surfaces. According to standards, each of the recording surfaces of the disk D is divided into an innermost annular region of a width equal to R2–R1 serving as a first nondata zone 1, an outermost annular region of a width equal to R4–R3 serving as a second nondata zone 2, and an intermediate annular region between the first nondata zone 1 and the second nondata zone 2 of a width equal to R3–R2 serving as a data zone 3.

As shown in FIG. 5A, servo patterns are formed in the data zone 3. The servo patterns are recorded at a plurality of positions on the disk D in a radial arrangement. Generally, the servo patterns are recorded while the disk D is rotated at a fixed rotating speed. Accordingly, portions of the servo patterns arranged in a radial arrangement near the outer circumference of the disk D are wider than those of the servo patterns arranged in a radial arrangement near the inner circumference of the disk D.

As shown in FIG. 5B, the servo pattern comprises servo information M and an A burst A(k) (k=2, 4, . . . , 2n) or a B burst B(k) (k=1, 3, . . . , 2n+1) following the servo information M.

The servo patterns are formed in concentric circles along the center lines $O_x$ (x=1, 2, . . . , n) of tracks. The distance between the adjacent center lines ox is equal to a tack pitch Tp on the order of, for example, 10 μm. The inner edge $E_{in}$ of the A burst A (2) and the outer edge $E_{out}$ of the B burst B (1) coincide with the center line O1. The outer edge $E_{out}$ of the A burst A(2) and the inner edge $E_{in}$ of the B burst B(3) coincide with the center line $O_2$. The servo information M includes servo preamble, a servo address mark and a servo address (gray code) recorded in succession. For example, servo information M includes an index signal in a servo pattern at one or a plurality of positions on one circle.

When the disk D is loaded into a disk drive for recording or reproducing, a magnetic head unit Ha reads the servo information M. When the servo information M is read it is recognized that the servo information M is followed by an A burst and a B burst. The scanning position of the magnetic head unit Ha is controlled so that the level of an output provided by a read head Hr included in the magnetic head unit Ha when the A burst is reproduced and the level of an output provided by the read head Hr when the B burst is read are equal to each other, and the magnetic head unit Ha is controlled for tracking so that the center of the magnetic gap of the read head Hr move on the center line $O_x$ of the track.

When the read head Hr leaves a data zone 3 and moves into a first nondata zone 1 or a second nondata zone 2 on a disk provided with servo patterns only in the data zones 3, the servo control of the read head Hr for tracking become impossible. For example, the position of the read head Hr become uncontrollable if the read head Hr leaves the data zone 3 and goes into the first nondata zone 1 during a data searching operation. In such a case, the magnetic head unit Ha moves suddenly to a waiting position over the periphery of the disk at a high speed, and stops with shocks at a position corresponding to the outer circumference of the disk. Such shocks may possibly damage the read head Hr and cause associated mechanisms to malfunction. Servo patterns are written to part of the nondata zones 1 and 2 so as to extend into the data zone 3 to avoid such a trouble.

However, since the disk to which the servo patterns are to be written is intended for high-density recording and the track pitch Tp is very small, a servo pattern recording process requires a very long time if the servo patterns are recorded at the track pitch Tp in a wide range in the nondata zone.

SUMMARY OF THE INVENTION

The present invention has been made to solve the foregoing problems in the prior art and it is therefore an object of the present invention to provide a disk provided with servo patterns, enabling tracking servocontrol even in a state where a read head is in a nondata zone, and enabling recording the servo pattern in a nondata zone in a very short recording time.

Another object of the present invention is to provide a servo pattern recording method capable of recording servo patterns in a nondata zone of a disk in a short recording time.

According to a first aspect of the present invention, a disk provided with servo patterns has a first nondata zone, a data zone and a second nondata zone formed in that order in concentric annular regions from the inner toward the outer circumference thereof. Each of the servo patterns has servo information and at least a first burst signal and a second burst signal recorded respectively on the opposite sides of a track, the servo patterns are recorded at a predetermined track pitch in the data zone in a radial arrangement, and the servo patterns are recorded at least in either the first or the second nondata zone at a track pitch greater than that at which the servo patterns are recorded in the data zone.

This disk enables a tracking servo control operation even when a read head or a write head included in a disk drive is in the nondata zone and enables an operation to return the read head or the write head immediately from the nondata zone to the data zone.

Since the servo patterns are formed in the nondata zone at the track pitch greater than that at which the servo patterns are formed in the data zone, a servo pattern recording process for recording the servo patterns on the disk can be achieved in a short time.

Preferably, the servo patterns are recorded in a region of the nondata zone contiguous with the data zone at the track pitch at which the servo patterns are recorded in the data zone, and the servo patterns are recorded in a region of the nondata zone apart from the data zone at the track pitch greater than that at which the servo patterns are recorded in the data zone.

When the servo patterns are thus recorded, the servo patterns are arranged successively at the same track pitch in a region including the boundary between the data zone and the nondata zone, and hence a highly accurate tracking servo control operation can surely be performed to the limit of the data zone.

Preferably, the servo patterns recorded at the great track pitch in the nondata zone are continuous across the tracks.

When the servo patterns are thus formed so as to be radially continuous in the entire surface of the disk, errors are not made in writing the servo patterns, and previously recorded servo patterns do not remain not erased when re-recording servo patterns.

According to a second aspect of the present invention, a method of recording servo patterns each having servo information, a first burst signal and a second burst signal to be recorded opposite to the first burst signal with respect to a track by a magnetic head on a disk comprises the steps of recording the servo patterns at a predetermined track pitch radially continuously in a data zone in an intermediate region with respect to a radial direction on the disk by radially moving the magnetic head at a fixed pitch, and recording the servo patterns at least in either a first nondata zone continuous with the inner circumference of the data zone or a second nondata zone contiguous with the outer circumference of the data zone at a track pitch greater than that at which the servo patterns are recorded in the data zone by feeding the magnetic head radially at a feed pitch greater than that at which the magnetic head is fed radially in the data zone.

Preferably, the track pitch in the nondata zone is not greater than the track width of the magnetic head, and the servo patterns formed in the nondata zone are continuous in a radial direction.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1A:
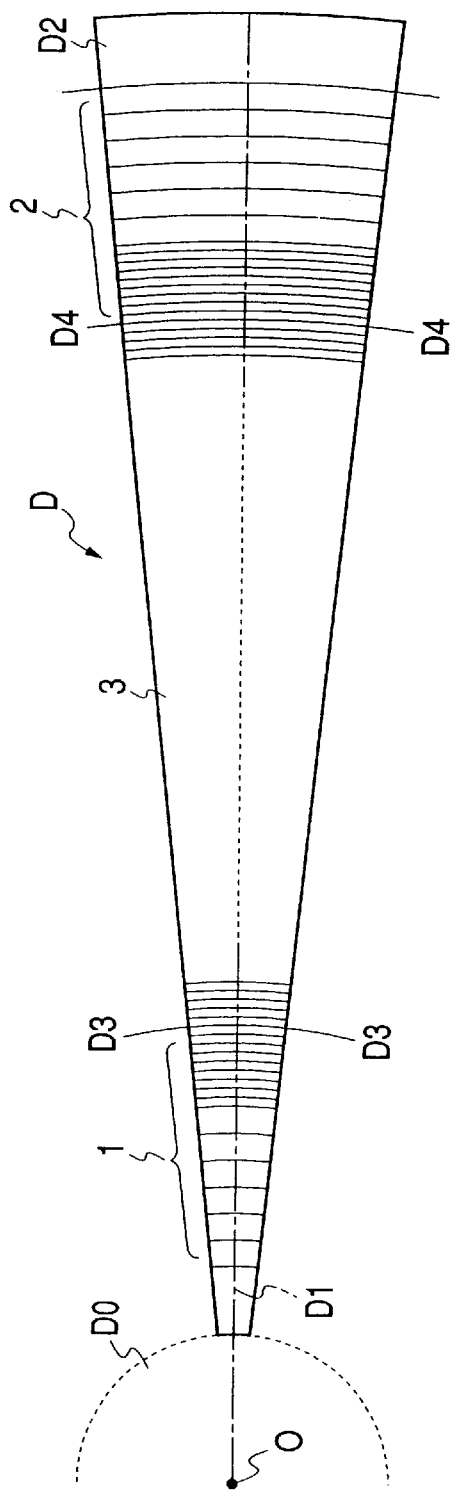
FIG. 1A is a fragmentary plan view of servo patterns recorded on a disk.
Figure 1B:
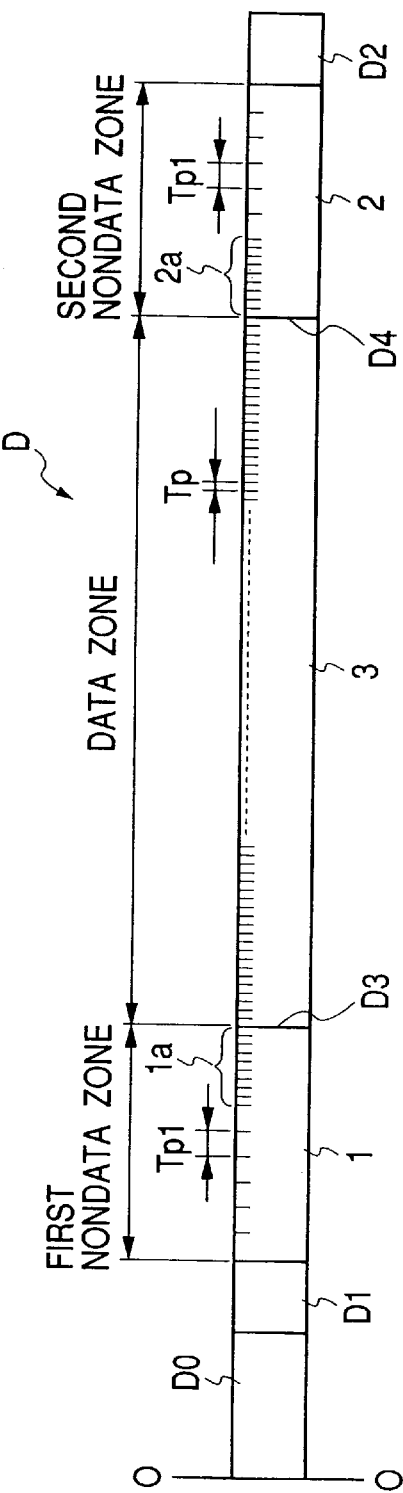
FIG. 1B is a sectional view of the servo patterns of FIG. 1A.
Figure 2:
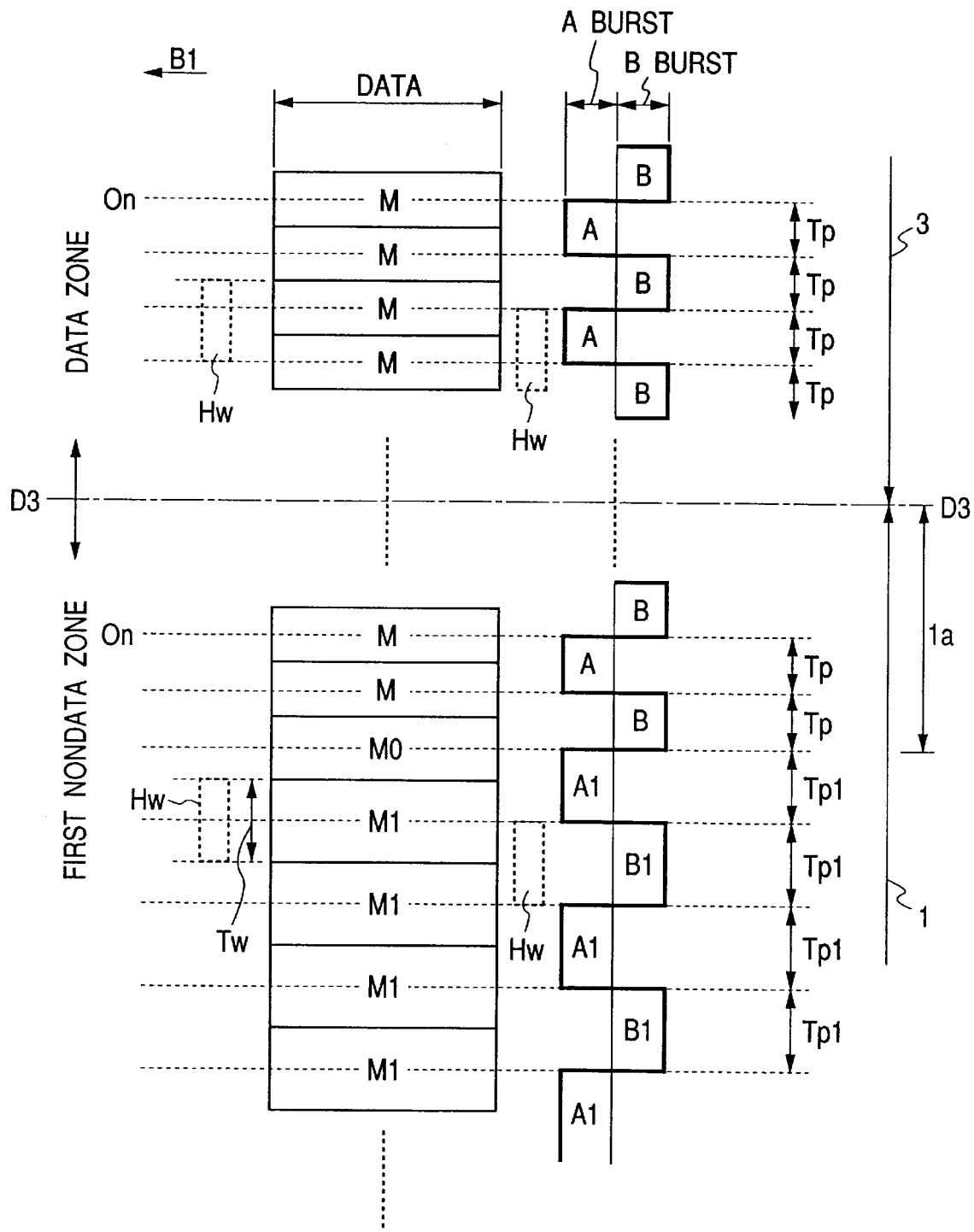
FIG. 2 is a plan view of servo patterns recorded in a data zone and a nondata zone.

FIG. 1A is a fragmentary plan view showing servo patterns recorded radially continuously on a disk D, FIG. 1B is a sectional view of the servo patterns of FIG. 1A, and FIG. 2 is an enlarged plan view of servo patterns. In FIGS. 1A and 1B, the center O of the disk D is on the left side and the periphery of the disk D is on the right side. The disk D is a floppy disk capable of recording information on both surfaces.

Figure 3:
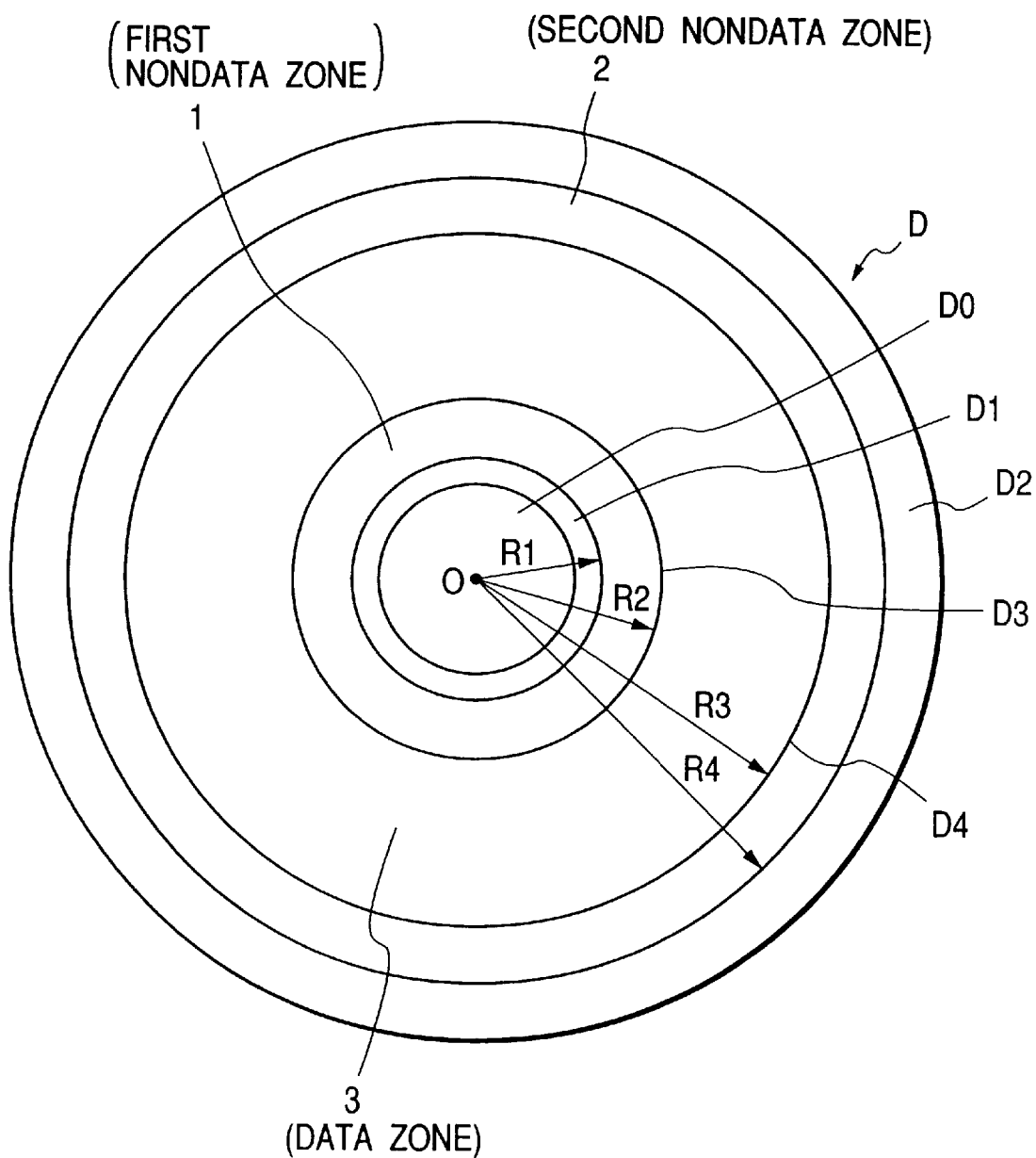
FIG. 3 is a plan view of a disk.

The disk D has a central hole D0, an inner peripheral part D1 contiguous with the inner edge thereof defining the center hole D0, and an outer peripheral part D2 contiguous with the outer edge thereof. Data can be recorded in and can be reproduced from a region except the inner peripheral part D1 and the outer peripheral part D2. A first nondata zone 1 a data zone 3 and a second nondata zone 2 are arranged in that order from the central toward the peripheral side of the disk as shown in FIG. 3.

Figure 4:
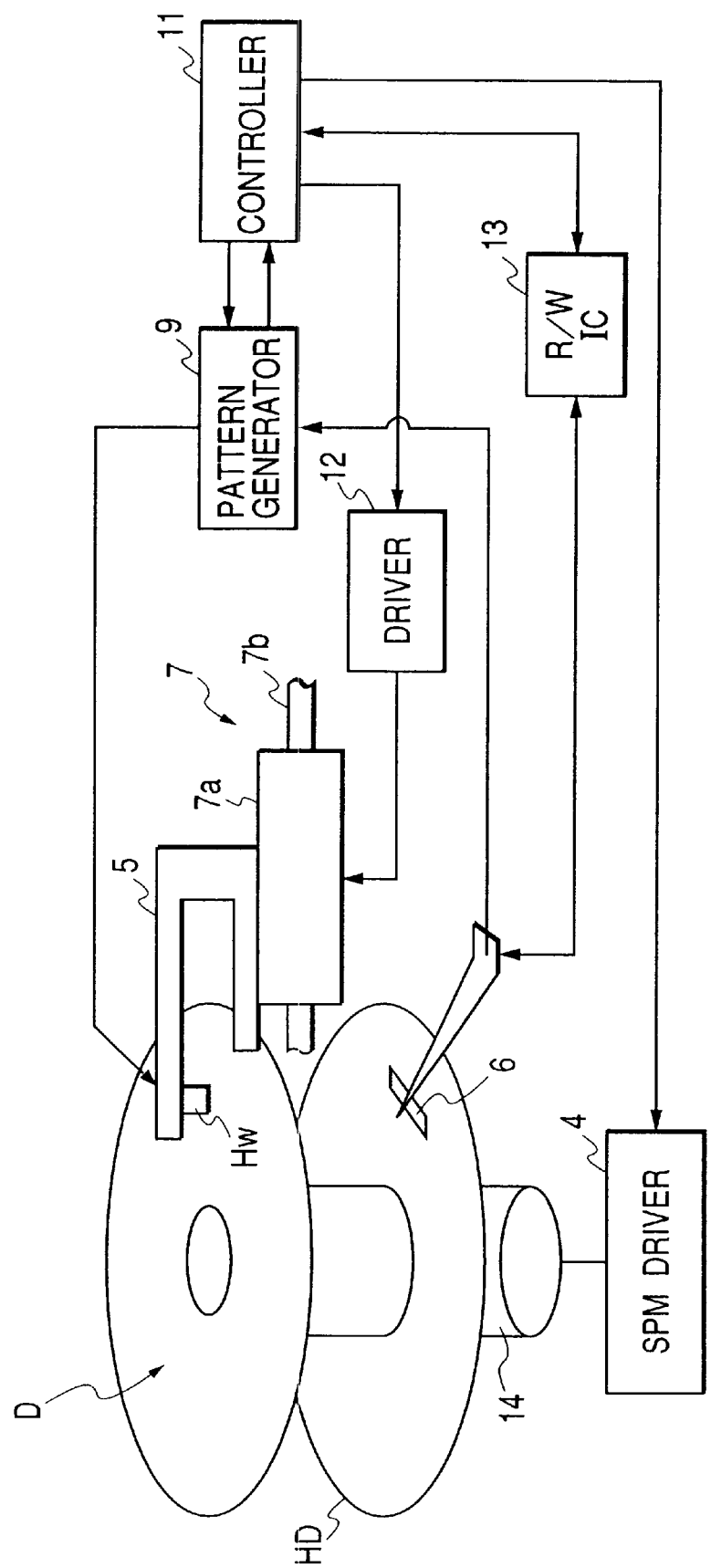
FIG. 4 is a block diagram of a servo pattern recording apparatus.

The data zone 3 and the first nondata zone 1 are demarcated by a boundary line D3, and the data zone 3 and the second nondata zone 2 are demarcated by a boundary line D4. Servo patterns are recorded in the first nondata zone 1, the data zone 3 and the second nondata zone 2. Generally, the servo patterns are recorded on the disk D by a servo pattern recording apparatus as shown in FIG. 4 before shipping the disk D.

The servo patterns are recorded radially continuously on concentric tracks of the disk D.

As shown in FIGS. 1A and 1B, tracks are formed in the data zone 3 at a fixed track pitch Tp in the range of about 5 to about 15 $\mu$m. As shown in FIG. 2, servo information M included in the servo pattern has servo preamble, servo address mark and a servo address (gray code) in a successive arrangement. For example, the servo information M included in one or a plurality of servo patterns on one circle includes an index signal. The center of the servo information M coincides with a track center On. The servo information M is followed by an A burst signal (code A) and a B burst signal (code B). The A burst signal and the B burst signal are recorded on the opposite sides of the track center On, respectively, in a staggered arrangement. Pieces of servo information M recorded on the tracks are continuous with respect to a radial direction, and the A burst signals and the B burst signals recorded on the tracks are continuous.

As shown in FIG. 1B, in a range 1a extending in a predetermined width from the boundary D3 between the first nondata zone 1 and the data zone 3 in the first nondata zone 1, the track pitch is equal to the track pitch Tp of the tracks in the data zone 3. A track pitch Tp1 of tracks in the first nondata zone 1a on the inner side of the range 1a is greater than the tack pitch Tp in the data zone 3. Similarly, the servo patterns are recorded in a range 2a extending in a predetermined width from the boundary D4 between the data zone 3 and the second nondata zone 2 in the second nondata zone 2 at a track pitch equal to the track pitch Tp in the data zone 3, and the servo patterns are recorded in regions outside the region 2a at the track pitch Tp1 greater than the track pitch Tp at which servo patterns are recorded in the data zone 3, In FIG. 2, pieces of servo information included in the servo patterns recorded at the wider track pitch Tp1 are designated by M1, and the A burst signals and the B burst signals are designated by A1 and B1, respectively. In the first nondata zone 1, a piece of servo information recorded at a position where the track pitch changes from Tp to Tp1 is designated by M0. In the region where the track pitch is Tp1, the pieces of servo information M0 and M1 are continuous in the radial direction. Accordingly, the servo information M1 is wider than the servo information M, and the A burst signal A1 and the B burst signal B1 are wider than the A burst signal A and the B burst signal of the data zone, respectively. Servo patterns the same as those in the FIG. 2 are formed in the second nondata zone 2.

Figure 5A:
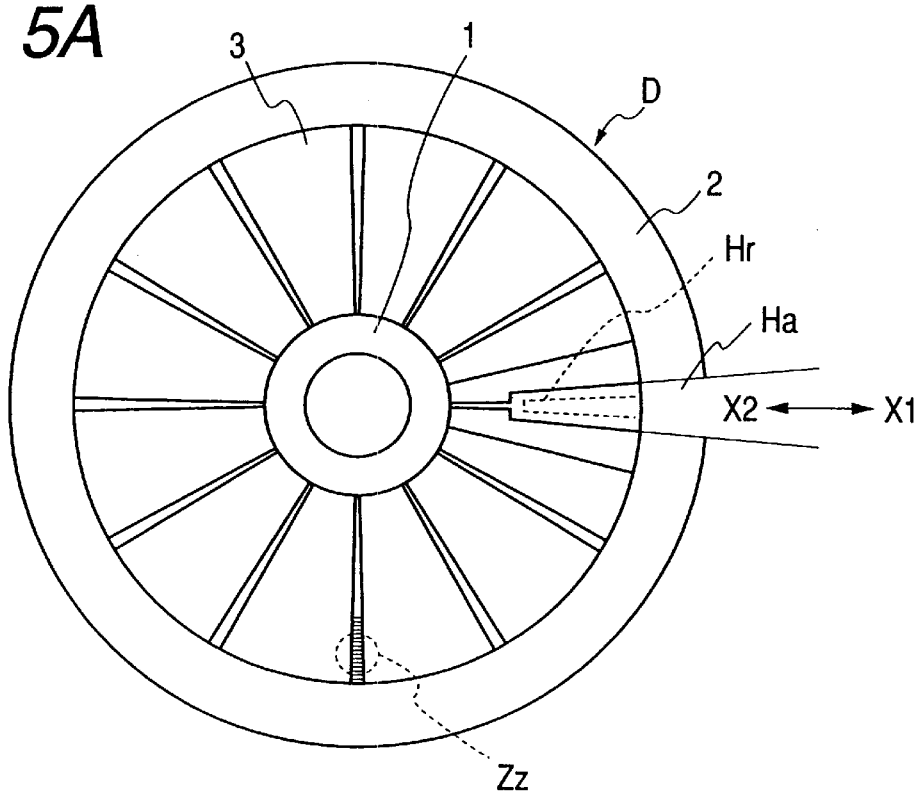
FIG. 5A is a plan view of servo patterns recorded on a disk.
Figure 5B:
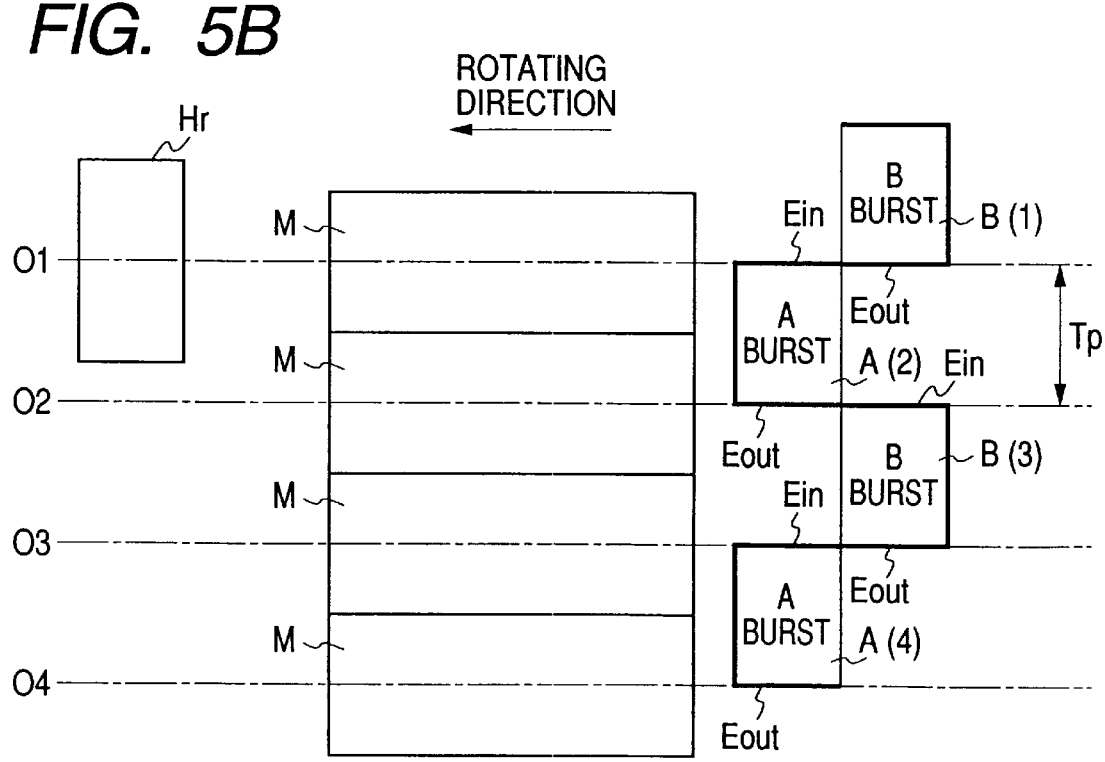
FIG. 5B is an enlarged plan view of servo patterns.

When the disk D is loaded into a disk drive to record data on or to reproduce data from the disk D, a tracking servo control operation can be executed even if the read head Hr shown in FIG. 5A comes off the data zone 3 and goes into the first nondata zone 1 or the second nondata zone 2, and the position of the read head Hr can always be controlled. For example, the read head Hr can immediately be returned to the data zone 3.

Referring to FIG. 4 showing a servo pattern recording apparatus for recording the servo pattern on the disk D, the servo pattern recording apparatus has a controller 11 including a CPU and memories for controlling a spindle motor (SPM) 14 and a carriage 5. In the servo pattern recording apparatus, the disk D, i.e., a recording medium, such as a flopping disk, on which the servo patterns are recorded, and a hard disk HD, i.e., a master disk on which a reference clock is recorded, are mounted coaxially on the output shaft of a spindle motor 14. The disk D and the hard disk HD are driven for rotation under the same condition.

A spindle motor driver (SPM driver) 4 controlled by a controller 11 supplies driving current to the spindle motor 14 to drive the disk D and the hard disk HD for rotation at a fixed rotating speed. A carriage 5 (magnetic head support means) supporting the magnetic head is moved in radial directions with respect to the disk D by a moving mechanism (moving means) 7. The moving mechanism 7 is, for example, a linear driving mechanism including a linear guide 7b, a moving member 7a capable of moving along the linear guide 7b, coils mounted on the moving member 7a, and magnets installed opposite to the coil on a fixed member.

The controller 11 gives a carriage driver 12 a tracking signal, the carriage driver supplies a driving current to the coil of the moving mechanism 7. Consequently, the moving member 7a supporting the carriage 5 is moved by the moving mechanism 7 (linear driving mechanism) in a radial direction with respect to the disk D. A recording head Hw for writing predetermined servo patterns to the disk D is mounted on the carriage 5. The recording head Hw is pressed against the disk D by an elastic member, such as a plate spring. If the disk D is of a two-sided type, a pair of recording heads Hw are mounted on the carriage 5 so as to be pressed against the both surfaces, respectively, of the disk D. A write signal generated by a pattern generator 9 is given to the recording head Hw.

A floating recording/reproducing head 6 is used in combination with the hard disk HD. The recording/reproducing head 6 reads and writes a reference clock signal. The controller 11 gives a control signal to a read/write integrated circuit (R/W IC) 13 to control the recording/reproducing head 6 for writing a reference clock signal to and reading the reference clock signal from the hard disk HD.

A servo pattern recording method to be carried out by the servo pattern recording apparatus will be described below. The hard disk HD is rotated by the spindle motor 14. The recording/reproducing head 6 records a reference clock signal onto the hard disk HD on the basis of a control clock signal generated by the controller 11. The recording/reproducing head 6 reproduces the reference clock signal upon the completion of the recording of the reference clock signal to see if there in any timing error. If the reference clock signal is normal, the reference clock signal is used. If the reference clock signal is abnormal or if errors are made in reading the reference clock signal, the reference clock signal is written again to the hard disk HD.

A disk D to which the servo patterns are to be written is mounted clamped on the spindle motor 14 and the disk D and the hard disk HD are rotated simultaneously by the spindle motor 14. The recording/reproducing head 6 reads the reference clock signal from the hard disk HD and gives the same to the pattern generator 9. Then, the pattern generator 9 generates servo pattern write data, a write gate signal (WG) and a write data enable signal (WDE) in synchronism with the reference clock signal read from the hard disk HD, and supplies recording currents corresponding to those signals to the recording head Hw.

Meanwhile, the controller 11 generates a highly accurate tracking signal to move the recording head Hw by a distance corresponding to the track pitch Tp at a time and gives the tracking signal to the carriage driver 12 to move the carriage in a radial direction relative to the disk D in synchronism with the rotation of the disk D. A series of those control operations are carried out to record the predetermined servo pattern shown in FIG. 2 every one rotation of the disk D. Since the disk D and the hard disk HD are rotated synchronously, the servo patterns can be recorded with high fidelity to the reference clock signal recorded on the hard disk HD.

When recording the servo pattern in the data zone 3, the carriage 5 is moved radially relative to the disk D at a fixed pitch to record the servo patterns at the track pitch Tp. In regions 1a and 2a in the first nondata zone 1 and the second nondata zone 2, the carriage 5 is moved at the same pitch as that at which the carriage 5 is moved for recording in the recording zone 3 to record the servo patterns at the track pitch Tp. The carriage 5 is moved at a track pitch Tp1 in ranges corresponding to an inner peripheral region of the first nondata zone 1 and an outer peripheral region of the second nondata zone 2.

In FIG. 2, indicated at Tw is the recording track width of the recording head Hw. When recording the servo patterns, the servo patterns are recorded in an overwrite mode to form an edge for each pattern. Therefore the servo information M1, the A burst signal A1 and the B burst signal B1 can be recorded contiguously in the track pitch Tp1 when the greater track pitch Tp1 is not greater than the track width T2.

If a recording error is made while the servo pattern recording apparatus shown in FIG. 4 is in recording operation, the servo patterns are rewritten. If the servo information M1, the A burst signal A1 and the B burst signal B1 are recorded continuously in a direction parallel to a radius of the disk D as shown in FIG. 2, failure in erasing the previously recorded data before rewriting does not occur.

When the servo patterns are not rewritten, any problem will not arise if the greater track pitch Tp1 is not smaller than the recording track width T2, and some part of the servo information and the burst signals remaining not erased is not large to hinder tracking servo control operation.

Track pitches of tracks in the nondata zones may gradually be increased with the distance from the boundaries between the data zone and the nondata zones.

As is apparent from the foregoing description, according to the present invention, the servo patterns are formed also in the nondata zones of the disk. Therefore, the tracking servo control operation is effective even if the magnetic head of the disk drive is moved to a position corresponding to the nondata zone and hence the magnetic head can immediately be returned to a position corresponding to the data zone.

Since the servo patterns are recorded in the nondata zones at the track pitch greater than that at which data is recorded in the data zone, the time necessary for recording the servo patterns can be reduced.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:
1. A disk provided with servo patterns, having a first nondata zone, a data zone and a second nondata zone formed in that order in concentric annular regions from an inner toward an outer circumference thereof; each of said servo patterns having servo information and at least a first burst signal and a second burst signal recorded respectively on the opposite sides of a track, said servo patterns being recorded at a predetermined track pitch in the data zone in a radial arrangement, and said servo patterns being recorded at least in either the first or the second nondata zone at a track pitch greater than that at which the servo patterns are recorded in the data zone.

2. The disk according to claim 1, wherein the servo patterns are recorded in a region of the nondata zone contiguous with the data zone at the track pitch at which the servo patterns are recorded in the data zone, and the servo patterns are recorded in a region of the nondata zone apart from the data zone at the track pitch greater than that at which the servo patterns are recorded in the data zone.

3. The disk according to claim 1, wherein the servo patterns recorded at the greater track pitch in the nondata zone are continuous across the tracks.

4. A method of recording servo patterns each having servo information, a first burst signal and a second burst signal to be recorded opposite to the first burst signal with respect to a track by a magnetic head on a disk, said method comprising the steps of:

recording the servo patterns at a predetermined track pitch radially continuously in a data zone in an intermediate region with respect to a radial direction on the disk by radially moving the magnetic head at a fixed pitch, and recording the servo patterns at least in either a first nondata zone continuous with the inner circumference of the data zone or a second nondata zone contiguous with the outer circumference of the data zone at a track pitch greater than that at which the servo patterns are recorded in the data zone by feeding the magnetic head radially at a feed pitch greater than that at which the magnetic head is fed radially in the data zone.

5. The method according to claim 4, wherein the track pitch in the nondata zone is not greater than a track width of the magnetic head, and the servo patterns formed in the nondata zone are continuous in a radial direction.

* * * * *